(12) United States Patent
Niizuma (10) Patent No.: US 9,748,037 B2
(45) Date of Patent: Aug. 29, 2017

(54) POWER SUPPLY SYSTEM AND WIRELESS POWER SUPPLY METHOD

(71) Applicant: IHI Corporation, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 577 days.

(21) Appl. No.: 14/301,543

(22) Filed: Jun. 11, 2014

(65) Prior Publication Data

US 2014/0292079 A1 Oct. 2, 2014

Related U.S. Application Data

(63) Continuation of application No. PCT/JP2012/082308, filed on Dec. 13, 2012.

(30) Foreign Application Priority Data

Dec. 16, 2011 (JP) ................. 2011-275731

(51) Int. Cl.
*F25B 27/00* (2006.01)
*H02J 5/00* (2016.01)
(Continued)

(52) U.S. Cl.
CPC ............. *H01F 38/14* (2013.01); *H02J 5/005* (2013.01); *H02J 7/0055* (2013.01); *H02J 7/025* (2013.01);
(Continued)

(58) Field of Classification Search
CPC ........ F25B 27/00; F25D 11/003; H01F 38/14; H02J 5/005; H02J 7/025; H02J 17/00;
(Continued)

(56) References Cited

U.S. PATENT DOCUMENTS

| 3,054,024 A | 9/1962 | Van Dillen et al. .......... 317/101 |
| 4,680,674 A | 7/1987 | Moore .......................... 361/395 |

(Continued)

FOREIGN PATENT DOCUMENTS

| JP | 58-066542 | 4/1983 |
| JP | 08-019985 | 1/1996 |

(Continued)

OTHER PUBLICATIONS

Japanese Office Action, dated Jun. 16, 2015, issued in corresponding Japanese Patent Application No. 2011-275731. English translation. Total 8 pages.

(Continued)

*Primary Examiner* — Levi Gannon
(74) *Attorney, Agent, or Firm* — Ostrolenk Faber LLP (57) ABSTRACT

The power supply system includes: movable power-receiving units, each power-receiving unit including at least one power-receiving device used to receive electric power from outside of the power-receiving unit and at least one power-supplying device used to supply, to the outside of the power-receiving unit, at least part of electric power received by the power-receiving device; and a power-supplying unit used to supply electric power to the power-receiving device of one power-receiving unit of the power-receiving units.

10 Claims, 7 Drawing Sheets

(51) Int. Cl.
*H01F 38/14* (2006.01)
*H02J 50/12* (2016.01)
*H02J 7/02* (2016.01)
*H02J 7/35* (2006.01)
*H02J 7/00* (2006.01)
*F25D 11/00* (2006.01)

(52) U.S. Cl.
CPC ............... *H02J 7/35* (2013.01); *H02J 50/12* (2016.02); *F25B 27/00* (2013.01); *F25D 11/003* (2013.01); *Y10T 307/305* (2015.04)

(58) Field of Classification Search
CPC ........ H02J 50/10; H02J 50/12; H04B 5/0037; H04B 5/0075; Y10T 307/305
USPC .................................................... 307/18, 104
See application file for complete search history.

(56) References Cited

U.S. PATENT DOCUMENTS

| 8,456,038 | B2* | 6/2013 | Azancot | ................... | H01F 38/14 307/104 |
|---|---|---|---|---|---|
| 2010/0201201 | A1* | 8/2010 | Mobarhan | ............... | H02J 5/005 307/104 |
| 2010/0219183 | A1* | 9/2010 | Azancot | ................... | H01F 38/14 219/676 |
| 2011/0298419 | A1 | 12/2011 | Tsai et al. | ...................... | 320/108 |
| 2013/0020878 | A1* | 1/2013 | Karalis | ................... | H02J 7/025 307/104 |
| 2013/0312450 | A1 | 11/2013 | Iwasa | | |
| 2014/0008996 | A1* | 1/2014 | Iwasa | ........................ | E04B 5/43 307/104 |

FOREIGN PATENT DOCUMENTS

| JP | 2002-374700 | 12/2002 |
|---|---|---|
| JP | 2009-240098 A | 10/2009 |
| JP | 2010-158114 | 7/2010 |
| JP | 2010-262838 | 11/2010 |
| JP | 2011-205780 | 10/2011 |
| JP | 2012-238229 | 12/2012 |
| JP | 2012-239334 | 12/2012 |
| WO | WO 2009/129900 A1 | 10/2009 |
| WO | WO 2010/126010 A1 | 11/2010 |
| WO | WO 2013/027761 A1 | 2/2013 |
| WO | WO 2013/077450 A1 | 5/2013 |

OTHER PUBLICATIONS

Japanese Notice of Allowance, dated Sep. 1, 2015, issued in corresponding Japanese Patent Application No. 2011-275731. English translation. Total 6 pages.
International Search Report and Written Opinion mailed Mar. 12, 2013 in corresponding PCT International Application No. PCT/JP2012/082308.
Search Report dated Aug. 28, 2015 issued in corresponding European Patent Application No. 12857375.5.
Third Office Action dated Jan. 17, 2017 in corresponding Chinese Patent Application No. 201280061634.7 (with English language translation)(total 18 pages).
Knowledge, Skills and Standards, by Lin dehao, pp. 24-25, China electric power press, Dec. 31, 2014 (total 5 pages).
Engineering Design of Switching Power Supply Qiao, enming, pp. 105-106, China electric power press, Mar. 31, 2010 (total 6 pages).

* cited by examiner

LEFT SIDE VIEW    TOP VIEW    RIGHT SIDE VIEW

FRONT VIEW

POWER SUPPLY SYSTEM AND WIRELESS POWER SUPPLY METHOD

This application is a Continuation application based on International Application No. PCT/JP2012/082308, filed Dec. 13, 2012, which claims priority on Japanese Patent Application No. 2011-275731, filed Dec. 16, 2011, the contents of which are incorporated herein by reference.

TECHNICAL FIELD

The present invention relates to a power supply system and a wireless power supply method.

BACKGROUND ART

Patent Document 1 discloses a power supply apparatus capable of easily supplying, in a short time, electric power to a reefer container (hereinafter, referred to as "container") including a refrigeration unit. The power supply apparatus wirelessly supplies electric power to each of the containers as a power-receiving unit using a power-supplying unit provided at each of the containers which are stacked vertically and horizontally. The power-supplying unit includes a primary coil used to supply electric power and a moving mechanism used to move the primary coil, and the power supply apparatus arranges the primary coil to face a secondary coil (a power-receiving coil) provided in the container using the moving mechanism, thereby performing wireless power supply to the container.

DOCUMENT OF RELATED ART

Patent Document

[Patent Document 1] Japanese Patent Application, First Publication No. 2011-205780

SUMMARY OF INVENTION

Technical Problem

In the above-described related art, it is necessary to provide the power-supplying unit at each of the containers, and thus the installation space of the power-supplying units may be comparatively increased. As a result, the maximum number of containers which can be stored in a container storage facility (e.g., a reefer stand) may be decreased, and the space utilization efficiency may be deteriorated.

The present invention was made in view of the above circumferences, and an object thereof is to provide a power supply system and a wireless power supply method which can supply electric power to power-receiving units in a state where the high space utilization efficiency is secured.

Solution to Problem

According to a first aspect of the present invention, a power supply system includes: movable power-receiving units, each power-receiving unit including at least one power-receiving device receiving electric power from outside of the power-receiving unit and at least one power-supplying device supplying, to outside of the power-receiving unit, at least part of electric power received by the power-receiving device; and a power-supplying unit supplying electric power to the power-receiving device of one of the power-receiving units.

According to a second aspect of the present invention, in the first aspect, the power-receiving unit includes a power-generating device and is configured to supply electric power generated by the power-generating device, to outside of the power-receiving unit, through the power-supplying device.

According to a third aspect of the present invention, in the first aspect, the power-receiving unit includes: a load device consuming electric power; and a switching device supplying electric power from the power-receiving device to the load device when a voltage of electric power from the power-receiving device is greater than the voltage required to run the load device.

According to a fourth aspect of the present invention, in the second aspect, the power-receiving unit includes: a load device consuming electric power; and a switching device supplying electric power from the power-receiving device or from the power-generating device to the load device when a voltage of electric power from the power-receiving device or from the power-generating device is greater than the voltage required to run the load device.

According to a fifth aspect of the present invention, in any one of the first to fourth aspects, the power-receiving device, the power-supplying device and the power-supplying unit are configured to wirelessly receive or supply electric power.

According to a sixth aspect of the present invention, in the fifth aspect, the power-receiving device includes a power-receiving coil, and each of the power-supplying device and the power-supplying unit includes a power-transmitting coil. In addition, the power-receiving device, the power-supplying device and the power-supplying unit are configured to wirelessly receive or supply electric power through an electromagnetic coupling between the power-receiving coil and the power-transmitting coil.

According to a seventh aspect of the present invention, in any one of the first to sixth aspects, the power-receiving unit includes a pair of outer surfaces parallel to each other. In addition, the power-receiving device is provided in a first outer surface of the pair of outer surfaces, and the power-supplying device is provided in a second outer surface of the pair of outer surfaces.

According to an eighth aspect of the present invention, in any one of the first to sixth aspects, the power-receiving unit includes a pair of outer surfaces parallel to each other. The power-receiving device and the power-supplying device are provided in each of the pair of outer surfaces.

According to a ninth aspect of the present invention, in any one of the first to eighth aspects, the power-receiving unit includes at least two power-receiving/supplying devices. In addition, each power-receiving/supplying device has a function of the power-receiving device and a function of the power-supplying device, and is capable of switching between the function of the power-receiving device and the function of the power-supplying device.

According to a tenth aspect of the present invention, a wireless power supply method includes: an arrangement step of arranging a power-supplying device of a movable first power-receiving unit and a power-receiving device of a movable second power-receiving unit facing each other; a first power-supplying step of wirelessly supplying electric power to a power-receiving device of the first power-receiving unit from outside of the first power-receiving unit; and a second power-supplying step of wirelessly supplying at least part of electric power received by the power-receiving device of the first power-receiving unit, to the power-receiving device of the second power-receiving unit from the power-supplying device of the first power-receiving unit.

Effects of Invention

According to the present invention, each of the movable power-receiving units includes at least one power-receiving device used to receive electric power from outside of the power-receiving unit and at least one power-supplying device used to supply, to outside of the power-receiving unit, at least part of electric power received by the power-receiving device. Therefore, for example, two power-receiving units are arranged so that the power-supplying device of one of the power-receiving units and the power-receiving device of the other of the power-receiving units face each other, and thus electric power can be supplied from one power-supplying unit to both of the two power-receiving units. Consequently, according to the present invention, it is possible to decrease the number of power-supplying units as units used to supply electric power to the power-receiving units, and it is possible to supply electric power to the power-receiving units while high space utilization efficiency is secured.

DESCRIPTION OF EMBODIMENTS

Hereinafter, embodiments of the present invention are described with reference to the drawings.

First Embodiment

Figure 1:
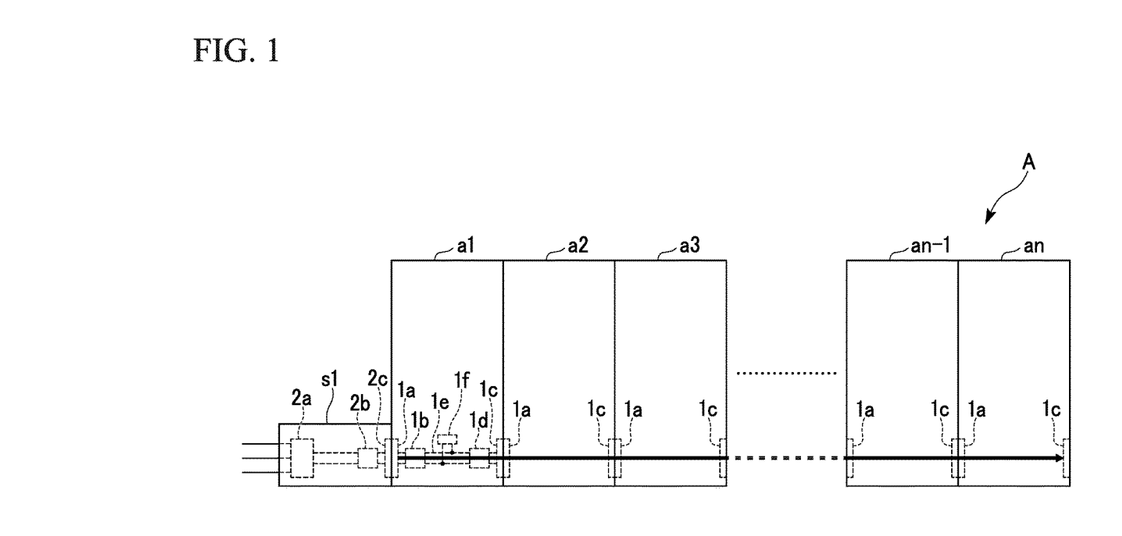
FIG. 1 is a top view of a power supply system according to a first embodiment of the present invention.

First, a first embodiment of the present invention is described. FIG. 1 is a top view of a power supply system A according to the first embodiment. As shown in FIG. 1, the power supply system A of the first embodiment includes containers a1 to an (power-receiving units) and a ground power-supplying unit s1 (a power-supplying unit). The power supply system A can supply electric power to any of the containers a1 to an using the magnetic field resonance, one type of wireless power supply. In addition, the power supply system A does not only perform the power-supplying operation from the ground power-supplying unit s1 to the container a1 adjacent thereto, but can also perform the power-supplying operations among the containers a1 to an by arranging the containers a1 to an adjacent to each other.

Each of the containers a1 to an is a movable metal storage container formed in a box shape (whose cross-section is a rectangular shape), and stores various cargos in the internal space thereof (a storage space) and is transported through a means of transport such as a truck or a container ship. As shown in FIG. 1, the shape viewed from above of each of the containers a1 to an is rectangle. That is, each of the containers a1 to an includes a left lateral surface and a right lateral surface (a pair of outer surfaces) which are disposed to be parallel to each other. It is to be noted that, if each of the containers a1 to an includes a pair of outer surfaces disposed to be parallel to each other, each of the containers a1 to an may be formed in another shape other than a box shape. The containers a1 to an are placed on a container yard or on a container ship so that a left lateral surface including a long edge of the container (the left lateral surface of one container) and a right lateral surface including a long edge of the container (the right lateral surface of another container) are adjacent to each other. The containers a1 to an have the same configuration, and accordingly, hereinafter the configuration of the container a1 is described as a typical example.

The container a1 includes a power-receiving coil $1a$ (a power-receiving device), a power-receiving circuit $1b$ (a power-receiving device), a power-transmitting coil $1c$ (a power-supplying device), a power-supplying circuit $1d$ (a power-supplying device), a DC bus $1e$, and a load $1f$ (a load device) in addition to the above-described storage space. The power-receiving coil $1a$ and the power-receiving circuit $1b$ compose a power-receiving device of the present invention. Furthermore, the power-transmitting coil $1c$ and the power-supplying circuit $1d$ compose a power-supplying device of the present invention.

The power-receiving coil $1a$ is a helical coil which is provided in the left lateral surface (a first outer surface) of the container a1, and both ends of the coil are connected to the input terminals of the power-receiving circuit $1b$. The portion of the left lateral surface of the container a1 in which the power-receiving coil $1a$ is provided is formed not of metal but of a material through which an external magnetic field can generate electromagnetic induction on the power-receiving coil $1a$ (a magnetic field transmissible material). The power-receiving coil $1a$ generates electromotive force through electromagnetic induction when the external magnetic field acts on the container a1 and outputs electric power (AC power) generated through electromagnetic induction, to the power-receiving circuit $1b$. The magnetic field transmissible material is a plastic, an FRP (Fiber Reinforced Plastic) or the like.

The power-receiving circuit $1b$ includes a resonance capacitor, wherein the resonance capacitor and the power-receiving coil $1a$ compose a power-receiving resonance circuit. The power-receiving circuit $1b$ is a rectifier circuit which converts AC power supplied from the power-receiving coil $1a$, into DC power. The power-receiving circuit $1b$ supplies the DC power through the DC bus $1e$ to the power-supplying circuit $1d$ and to the load $1f$.

The power-transmitting coil $1c$ is a helical coil which is provided in the right lateral surface (a second outer surface) of the container a1, and both ends of the coil are connected to the output terminals of the power-supplying circuit $1d$. The portion of the right lateral surface of the container a1 in which the power-transmitting coil $1c$ is provided is formed not of metal but of a material through which an magnetic field generated by the power-transmitting coil $1c$ can be transmitted to outside of the container a1 (a magnetic field transmissible material). The magnetic field transmissible material is a plastic, an FRP (Fiber Reinforced Plastic) or the like.

The power-supplying circuit $1d$ includes a resonance capacitor, wherein the resonance capacitor and the power-transmitting coil $1c$ compose a power-supplying resonance circuit. The power-supplying circuit 1d converts DC power supplied from the power-receiving circuit 1b through the DC bus 1e, into AC power, and supplies the AC power to the power-transmitting coil 1c. That is, the power-supplying circuit 1d is an inverter. The resonance frequency of the power-supplying resonance circuit is set to the same frequency as that of the above-described power-receiving resonance circuit.

Figure 2:
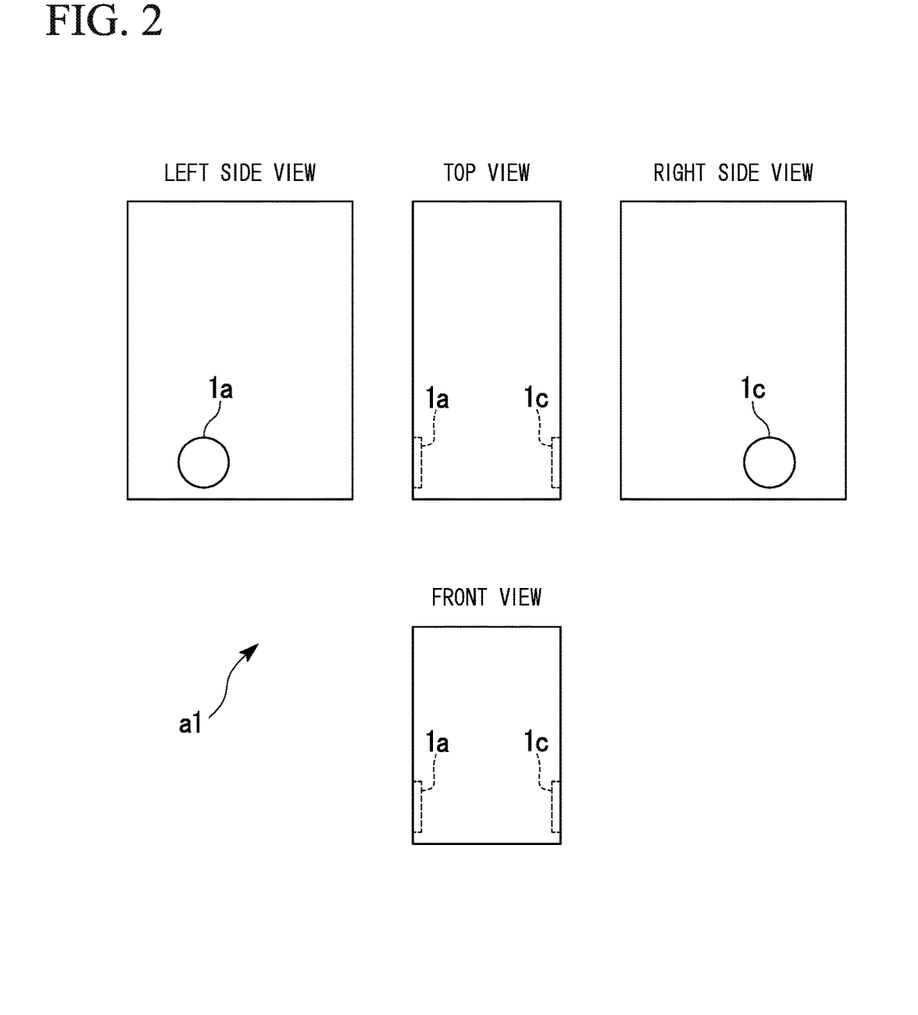
FIG. 2 is a development view of a container according to the first embodiment of the present invention.

FIG. 2 is a development view of the container a1 according to the first embodiment. As shown in FIG. 2, the power-receiving coil 1a and the power-transmitting coil 1c are provided in the left lateral surface and in the right lateral surface, respectively, at positions which are line-symmetric when viewed from above (left-right symmetry in FIG. 1). In addition, the distance in the vertical direction from the bottom surface (or from the top surface) of the container a1 to the power-receiving coil 1a is the same as the distance in the vertical direction from the bottom surface (or from the top surface) of the container a1 to the power-transmitting coil 1c. In other words, as shown in FIG. 2, the power-receiving coil 1a and the power-transmitting coil 1c are provided in the left lateral surface and in the right lateral surface, respectively, at positions which are opposite to each other both in the top view and in the front view.

The DC bus 1e is composed of a pair of power lines used to transmit DC power to the power-supplying circuit 1d and to the load 1f, wherein the DC power is output from the power-receiving circuit 1b. The load 1f is one of various kinds of units which is selected based on the kind of the container a1 (an auxiliary function), and those units include, for example, a refrigeration unit, a ventilation unit, a heat-retention unit, and a cooling unit. The load 1f is driven using DC power supplied from the power-receiving circuit 1b. That is, the container a1 is a reefer container (a refrigeration container) used to store fresh food, frozen food and the like in a state where they are frozen by a refrigeration unit, a ventilator container (a ventilation container) in which internal air is always ventilated by a ventilation unit (a ventilator), or the like. The load 1f may be a storage battery used to store surplus power.

In the container a1, within the DC power output from the power-receiving circuit 1b, the electric power remaining after removing electric power to be consumed by the load 1f is supplied to the power-supplying circuit 1d. In a state where the load 1f stops working, since the load 1f does not consume electric power, all the DC power output from the power-receiving circuit 1b is supplied to the power-supplying circuit 1d. That is, in the container a1, part of or all of DC power output from the power-receiving circuit 1b (at least part of the DC power) is supplied to the power-supplying circuit 1d in accordance with the state of the load 1f.

As shown in FIG. 1, the containers a1 to an are placed so that a left lateral surface including a long edge of the container (the left lateral surface of one container) and a right lateral surface including a long edge of the container (the right lateral surface of another container) are adjacent to each other. In this state, the power-receiving coil 1a and the power-transmitting coil 1c of the containers adjacent to each other are arranged facing each other. That is, the power-receiving coil 1a and the power-transmitting coil 1c of the containers adjacent to each other can wirelessly transmit electric power therebetween through electromagnetic induction.

As shown in FIG. 1, the ground power-supplying unit s1 includes a rectifier circuit 2a, a power-supplying circuit 2b, and a power-transmitting coil 2c. The power-transmitting coil 2c is provided at the position facing the power-receiving coil 1a of the container a1. The ground power-supplying unit s1 can wirelessly supply electric power to the power-receiving coil 1a of the container a1 using the power-transmitting coil 2c provided at the above-described position. The containers a1 to an can move, and each of the containers a2 to an has the same configuration as that of the container a1. Therefore, even if any one of the containers is arranged next to the ground power-supplying unit s1, the ground power-supplying unit s1 can supply electric power to the one container. Although the ground power-supplying unit s1 is installed on the ground in this embodiment, the installation position thereof is not limited thereto, and the ground power-supplying unit s1 may be installed underground.

The rectifier circuit 2a converts AC power (such as three-phase AC power) into DC power through rectification, wherein the AC power is supplied from an external power source (a commercial power source or a generator), and the rectifier circuit 2a outputs the DC power to the power-supplying circuit 2b. The power-supplying circuit 2b includes a resonance capacitor, wherein the resonance capacitor and the power-transmitting coil 2c compose a power-supplying resonance circuit. In addition, the power-supplying circuit 2b converts DC power input from the rectifier circuit 2a, into AC power, and supplies the AC power to the power-transmitting coil 1c. That is, the power-supplying circuit 2b is an inverter.

In a case where a DC power source such as a fuel battery, a solar battery, or a secondary battery is used as the external power source, the rectifier circuit can be omitted.

The resonance frequency of the power-supplying resonance circuit in the ground power-supplying unit s1 is set to the same frequency as that of the power-receiving resonance circuit and the power-supplying resonance circuit in the container a1. In addition, the coil diameter of the power-transmitting coil 2c in the ground power-supplying unit s1 is set to be the same as each coil diameter of the power-receiving coil 1a and the power-transmitting coil 1c in the container a1.

Next, the operations of the power supply system A having the above-described configuration are described in detail.

First, in the power supply system A, the containers a1 to an are arranged in an arrangement state as shown in FIG. 1 (an arrangement step). Subsequently, power supplying is started from the ground power-supplying unit s1 to the container a1 (a first power-receiving unit) which is adjacent to the ground power-supplying unit s1. That is, in the ground power-supplying unit s1, the rectifier circuit 2a converts AC power obtained from the external power source, into DC power, and outputs the DC power to the power-supplying circuit 2b. In addition, the power-supplying circuit 2b converts DC power into AC power and supplies the AC power to the power-transmitting coil 2c. As a result, the power-transmitting coil 2c of the ground power-supplying unit s1 and the power-receiving coil 1a of the container a1 are electromagnetically coupled together, and the wireless power transmission is performed (a first power-supplying step).

Subsequently, in the container a1, the power-receiving coil 1a outputs AC power received from the ground power-supplying unit s1, to the power-receiving circuit 1b, and the power-receiving circuit 1b converts the AC power into DC power and outputs the DC power through the DC bus 1e to the power-supplying circuit 1d and to the load 1f. In addition, the power-supplying circuit 1d converts DC power supplied through the DC bus 1e, into AC power, and supplies the AC power to the power-transmitting coil 1c. As a result, the power-transmitting coil 1c of the container a1 is electromagnetically coupled with the power-receiving coil 1a of the container a2 (a second power-receiving unit), and wirelessly supplies AC power to the power-receiving coil 1a of the container a2 (a second power-supplying step).

That is, the containers a1 to an of this embodiment are configured so that the power-transmitting coil 1c and the power-supplying circuit 1d (a power-supplying device) of the container a1 (a first power-supplying unit) to which electric power is supplied from the ground power-supplying unit s1 supply electric power to the power-receiving coil 1a and the power-receiving circuit 1b (a power-receiving device) of the container a2 (a second power-receiving unit) which is adjacent to the container a1.

Subsequently, containers a2 to an-1 operate in a similar way to the container a1 and wirelessly supply AC power to the containers a3 to an which are positioned on the right side of the containers a2 to an-1, respectively. That is, as shown in FIG. 1, electric power is sequentially supplied from the ground power-supplying unit s1 to the containers a1 to an in one direction (from left to right). Part of electric power supplied from the ground power-supplying unit s1 to the containers a1 to an is consumed by the load 1f of each of the containers a1 to an, and the refrigeration operation, the ventilation operation or the like is performed by the load 1f.

According to the above-described first embodiment, the containers a1 to an are electromagnetically coupled with each other using the power-receiving coils 1a and the power-transmitting coils 1c. The ground power-supplying unit s1 supplies AC power to the power-receiving coil 1a of the container a1 positioned at the end, whereby it is possible to supply AC power to all the containers a1 to an. Consequently, according to the first embodiment, it is not necessary to provide a power-supplying unit at each of the containers a1 to an, the number of power-supplying units can be reduced, and it is possible to supply electric power to each of the containers a1 to an in a state where the installation space of the power-supplying units is further decreased than in the related art.

Second Embodiment

Figure 3:
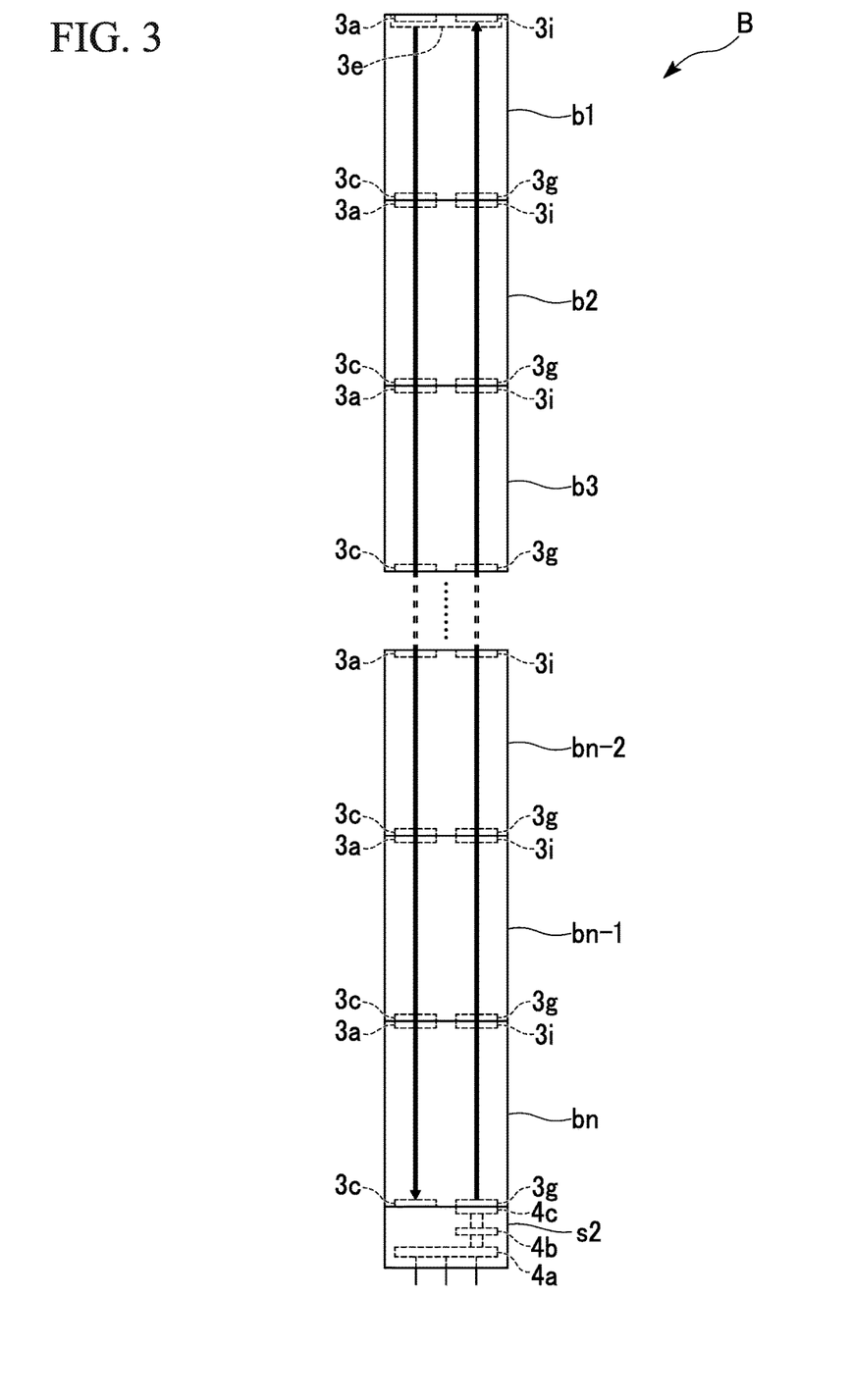
FIG. 3 is a front view of a power supply system according to a second embodiment of the present invention.
Figure 4:
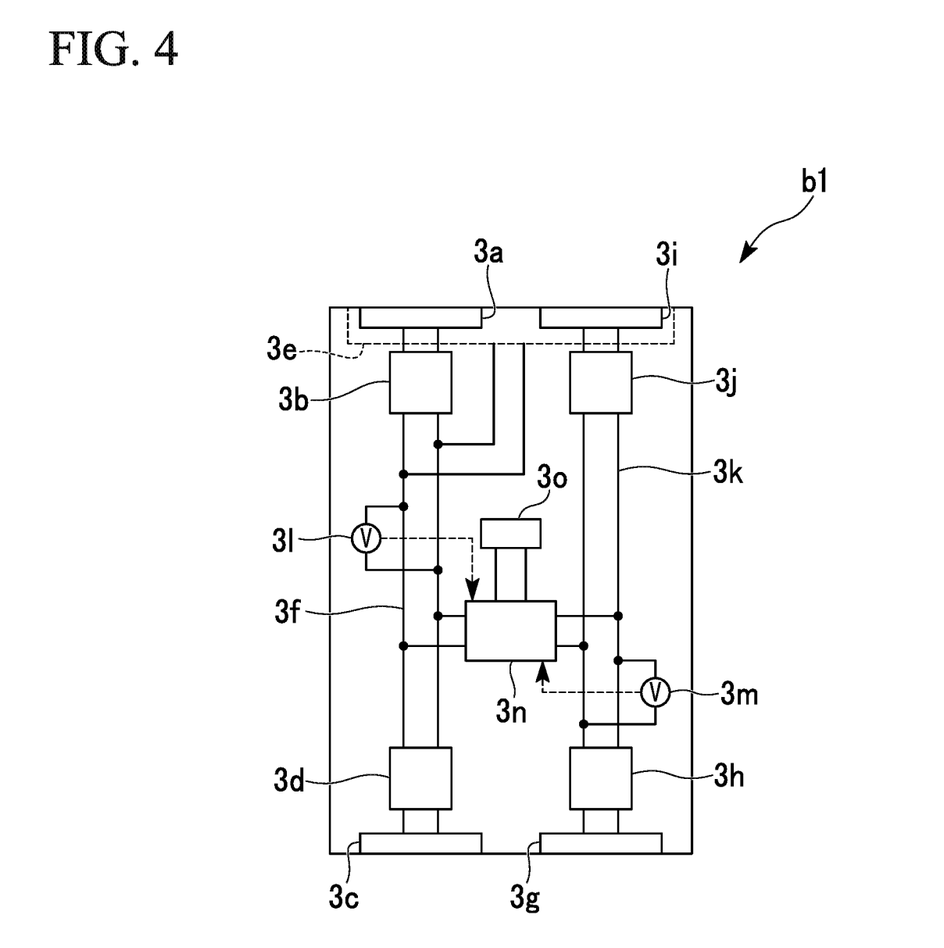
FIG. 4 is a schematic front view showing a configuration of a container according to the second embodiment of the present invention.
Figure 5:
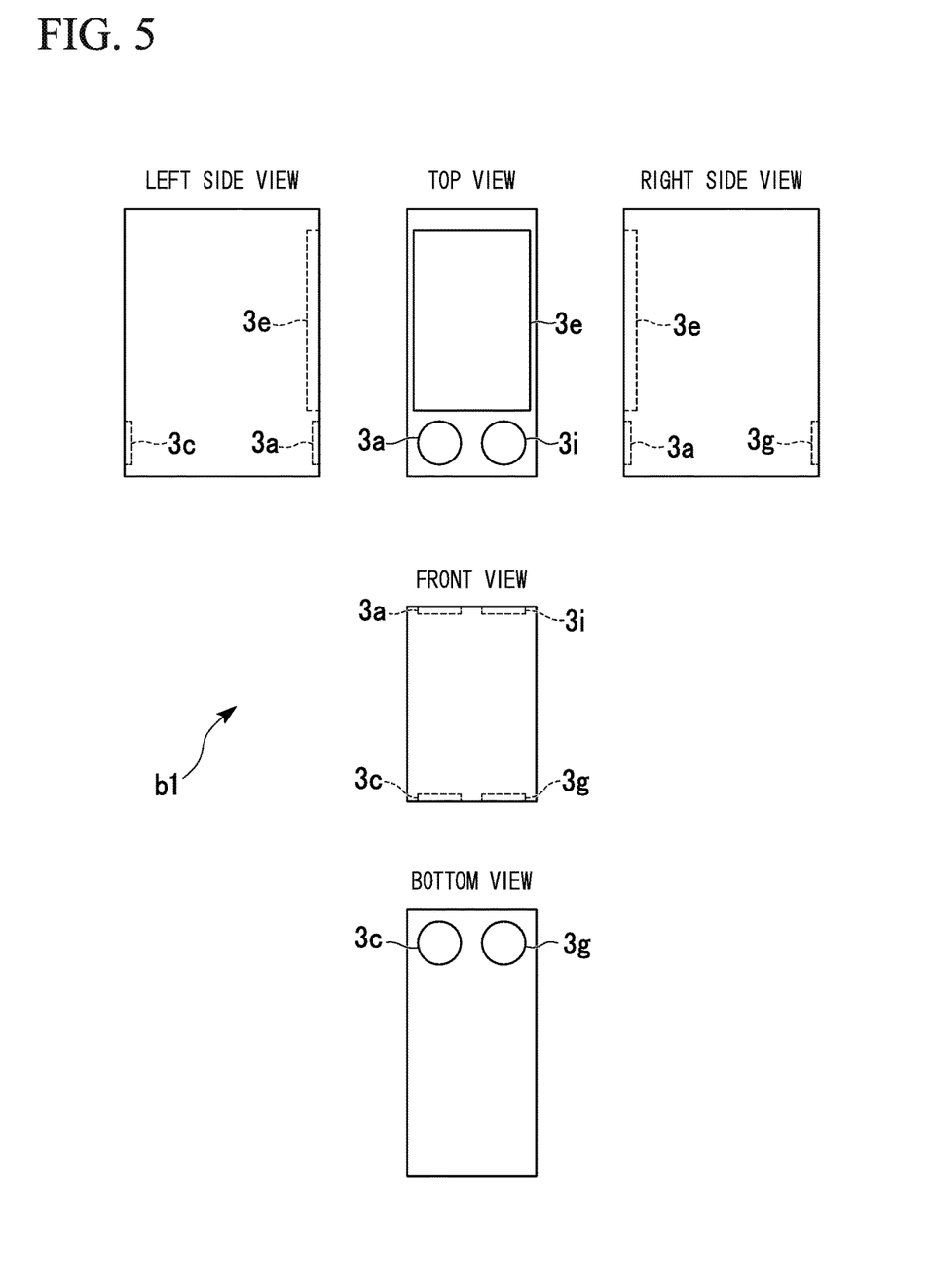
FIG. 5 is a development view of the container according to the second embodiment of the present invention.

Next, a second embodiment of the present invention is described with reference to FIGS. 3 to 5. FIG. 3 is a front view of a power supply system B according to the second embodiment. FIG. 4 is a schematic front view showing a configuration of a container b1 according to the second embodiment. FIG. 5 is a development view of the container b1.

In the power supply system B of the second embodiment, the configurations of containers b1 to bn and of a ground power-supplying unit s2 are different from those of the above-described first embodiment. As shown in FIG. 3, the power supply system B includes the containers b1 to bn (power-receiving units) and the ground power-supplying unit s2 (a power-supplying unit).

Similar to the first embodiment, the containers b1 to bn are movable box-shaped metal storage containers and store various cargos in an internal space (a storage space). As shown in FIG. 3, the shape of each of the containers b1 to bn when viewed from front is rectangle. That is, each of the containers b1 to bn includes a top surface and a bottom surface (a pair of outer surfaces) which are disposed to be parallel to each other. The containers b1 to bn are placed on a container yard or on a container ship so as to be vertically stacked so that a top surface including a short edge of the container (the top surface of one container) and a bottom surface including a short edge of the container (the bottom surface of another container) are adjacent to each other. The containers b1 to bn have the same configuration, and accordingly, hereinafter the configuration of the container b1 is described as a typical example.

As shown in FIG. 4, the container b1 includes a first power-receiving coil 3a (a power-receiving device), a first power-receiving circuit 3b (a power-receiving device), a first power-transmitting coil 3c (a power-supplying device), a first power-supplying circuit 3d (a power-supplying device), a solar battery panel 3e (a power-generating device), a first DC bus 3f, a second power-receiving coil 3g (a power-receiving device), a second power-receiving circuit 3h (a power-receiving device), a second power-transmitting coil 3i (a power-supplying device), a second power-supplying circuit 3j (a power-supplying device), a second DC bus 3k, a first voltage sensor 3l, a second voltage sensor 3m, a switching device 3n, and a load 3o (a load device) in addition to the above-described storage space.

The first power-receiving coil 3a and the first power-receiving circuit 3b among the above components compose a power-receiving device of this embodiment, and the second power-receiving coil 3g and the second power-receiving circuit 3h also compose a power-receiving device of this embodiment. In addition, the first power-transmitting coil 3c and the first power-supplying circuit 3d compose a power-supplying device of this embodiment, and the second power-transmitting coil 3i and the second power-supplying circuit 3j also compose a power-supplying device of this embodiment.

The first power-receiving coil 3a is a helical coil which is provided in the top surface of the container b1, and both ends of the coil are connected to the input terminals of the first power-receiving circuit 3b. The portion of the top surface of the container b1 in which the first power-receiving coil 3a is provided is formed not of metal but of a magnetic field transmissible material through which an external magnetic field can generate electromagnetic induction on the first power-receiving coil 3a. The first power-receiving coil 3a generates electromotive force through electromagnetic induction when the external magnetic field acts on the container b1 and outputs electric power generated through electromagnetic induction, to the first power-receiving circuit 3b.

The first power-receiving circuit 3b includes a resonance capacitor, wherein the resonance capacitor and the first power-receiving coil 3a compose a power-receiving resonance circuit, and is a rectifier circuit which converts AC power supplied from the first power-receiving coil 3a, into DC power. The first power-receiving circuit 3b supplies the DC power through the first DC bus 3f to the first power-supplying circuit 3d and to the switching device 3n.

The first power-transmitting coil 3c is a helical coil which is provided in the bottom surface of the container b1, and both ends of the coil are connected to the output terminals of the first power-supplying circuit 3d. The portion of the bottom surface of the container b1 in which the first power-transmitting coil 3c is provided is formed not of metal but of a magnetic field transmissible material through which a magnetic field generated by the first power-transmitting coil 3c can be transmitted to outside of the container b1.

The first power-supplying circuit 3d includes a resonance capacitor, wherein the resonance capacitor and the first power-transmitting coil 3c compose a power-supplying resonance circuit, and converts DC power supplied from the first power-receiving circuit 3b through the first DC bus 3f, into AC power, and supplies the AC power to the first power-transmitting coil 3c. That is, the first power-supplying circuit 3d is an inverter. The resonance frequency of the power-supplying resonance circuit composed of the first power-transmitting coil 3c and the first power-supplying circuit 3d is set to the same frequency as that of the power-receiving resonance circuit composed of the first power-receiving coil 3a and the first power-receiving circuit 3b.

As shown in FIG. 5, the first power-receiving coil 3a and the first power-transmitting coil 3c are provided in the top surface and in the bottom surface, respectively, at positions which are disposed so as to have up-down symmetry when viewed from left. In addition, the distance in the horizontal direction from the front surface of the container b1 to the first power-receiving coil 3a is the same as the distance in the horizontal direction from the front surface of the container b1 to the first power-transmitting coil 3c.

The solar battery panel 3e is provided in the top surface of the container b1 and is provided to be closer to the back surface (opposite to the front surface) than the first power-receiving coil 3a and the second power-transmitting coil 3i (described below) which are provided to be close to the front surface. The solar battery panel 3e includes a panel which is composed by, for example, series-parallel connecting a plurality of solar cells of monocrystal silicon, and generates electric power by converting energy from sunlight into electric power through the photovoltaic effect. The solar battery panel 3e outputs DC power through the first DC bus 3f to the first power-supplying circuit 3d and to the switching device 3n.

The first DC bus 3f is composed of a pair of power lines used to transmit DC power to the first power-supplying circuit 3d and to the switching device 3n, wherein the DC power is output from the first power-receiving circuit 3b and from the solar battery panel 3e.

The second power-receiving coil 3g is a helical coil which is provided in the bottom surface of the container b1, and both ends of the coil are connected to the input terminals of the second power-receiving circuit 3h. The portion of the bottom surface of the container b1 in which the second power-receiving coil 3g is provided is formed not of metal but of a magnetic field transmissible material through which an external magnetic field can generate electromagnetic induction on the second power-receiving coil 3g. The second power-receiving coil 3g generates electromotive force through electromagnetic induction when the external magnetic field acts on the container b1, and outputs electric power generated through electromagnetic induction, to the second power-receiving circuit 3h.

The second power-receiving circuit 3h includes a resonance capacitor, wherein the resonance capacitor and the second power-receiving coil 3g compose a power-receiving resonance circuit, and is a rectifier circuit which converts AC power supplied from the second power-receiving coil 3g, into DC power. The second power-receiving circuit 3h supplies the DC power through the second DC bus 3k to the second power-supplying circuit 3j and to the switching device 3n.

The second power-transmitting coil 3i is a helical coil which is provided in the top surface of the container b1, and both ends of the coil are connected to the output terminals of the second power-supplying circuit 3j. The portion of the top surface of the container b1 in which the second power-transmitting coil 3i is provided is formed not of metal but of a magnetic field transmissible material through which a magnetic field generated by the second power-transmitting coil 3i can be transmitted to outside of the container b1.

The second power-supplying circuit 3j includes a resonance capacitor, wherein the resonance capacitor and the second power-transmitting coil 3i compose a power-supplying resonance circuit, and converts DC power supplied from the second power-receiving circuit 3h through the second DC bus 3k, into AC power, and supplies the AC power to the second power-transmitting coil 3i. That is, the second power-supplying circuit 3j is an inverter. The resonance frequency of the power-supplying resonance circuit composed of the second power-transmitting coil 3i and the second power-supplying circuit 3j is set to the same frequency as that of the power-receiving resonance circuit composed of the second power-receiving coil 3g and the second power-receiving circuit 3h.

The resonance frequency of the power-receiving resonance circuit composed of the first power-receiving coil 3a and the first power-receiving circuit 3b and the resonance frequency of the power-supplying resonance circuit composed of the first power-transmitting coil 3c and the first power-supplying circuit 3d, which are set to the same frequency, are referred to as a "first resonance frequency". The resonance frequency of the power-receiving resonance circuit composed of the second power-receiving coil 3g and the second power-receiving circuit 3h and the resonance frequency of the power-supplying resonance circuit composed of the second power-transmitting coil 3i and the second power-supplying circuit 3j, which are set to the same frequency, are referred to as a "second resonance frequency". In this case, the first and second resonance frequencies may be the same or different from each other.

As shown in FIG. 5, the second power-receiving coil 3g and the second power-transmitting coil 3i are provided in the bottom surface and in the top surface, respectively, at positions which are disposed so as to have up-down symmetry when viewed from right. In addition, the distance in the horizontal direction from the front surface of the container b1 to the second power-receiving coil 3g is the same as the distance in the horizontal direction from the front surface of the container b1 to the second power-transmitting coil 3i.

The second DC bus 3k is composed of a pair of power lines used to transmit DC power to the second power-supplying circuit 3j and to the switching device 3n, wherein the DC power is output from the second power-receiving circuit 3h.

The first voltage sensor 3l is a sensor used to measure a voltage of the first DC bus 3f, and outputs a voltage signal indicating the voltage to the switching device 3n.

The second voltage sensor 3m is a sensor used to measure a voltage of the second DC bus 3k, and outputs a voltage signal indicating the voltage to the switching device 3n.

The switching device 3n switches between supply routes of electric power to the load 3o based on voltage signals input from the first voltage sensor 3l and from the second voltage sensor 3m. That is, the switching device 3n selectively switches the supply route of electric power to the load 3o, to one of the first DC bus 3f and the second DC bus 3k, thereby supplying electric power to the load 3o. The switching device 3n can be configured by, for example, employing an electronic switch as a means used to switch between supply routes of electric power in which a contactor or an FET (Field Effect Transistor) is used, and by combining an analog circuit or an A/D converter, a microprocessor, and a processing program, wherein the analog circuit and the A/D converter include a comparator to determine switching based on the voltage signals.

The load 3o is one of various kinds of units which is selected based on the kind of the container b1 (an auxiliary function), and those units include, for example, a refrigeration unit, a ventilation unit, a heat-retention unit, and a cooling unit. The load 3o is driven by DC power supplied through the switching device 3n from the first DC bus 3f or from the second DC bus 3k. That is, the container b1 is a reefer container (a refrigeration container) used to store fresh food, frozen food and the like in a state where they are frozen by the refrigeration unit, a ventilator container (a ventilation container) in which internal air is always ventilated by the ventilation unit (a ventilator), or the like. The load 3o may be a storage battery which stores surplus power.

In the container b1, when electric power is supplied from the first DC bus 3f to the load 3o through the switching operation of the switching device 3n, within the DC power output from the first power-receiving circuit 3b or from the solar battery panel 3e, the electric power remaining after removing electric power to be consumed by the load 3o is supplied to the first power-supplying circuit 3d. In addition, when electric power is not supplied from the first DC bus 3f to the load 3o through the switching operation of the switching device 3n, all the DC power output from the first power-receiving circuit 3b or from the solar battery panel 3e is supplied to the first power-supplying circuit 3d. That is, in the container b1, part of or all of the DC power output from the first power-receiving circuit 3b or from the solar battery panel 3e (at least part of the DC power) is supplied to the first power-supplying circuit 3d.

On the other hand, in the container b1, when electric power is supplied from the second DC bus 3k to the load 3o through the switching operation of the switching device 3n, within the DC power output from the second power-receiving circuit 3h, the electric power remaining after removing electric power to be consumed by the load 3o is supplied to the second power-supplying circuit 3j. In addition, when electric power is not supplied from the second DC bus 3k to the load 3o through the switching operation of the switching device 3n, all the DC power output from the second power-receiving circuit 3h is supplied to the second power-supplying circuit 3j. That is, in the container b1, part of or all of the DC power output from the second power-receiving circuit 3h (at least part of the DC power) is supplied to the second power-supplying circuit 3j.

As shown in FIG. 3, the containers b1 to bn are placed so as to be vertically stacked so that a top surface including a short edge of a front surface (the top surface of one container) and a bottom surface including a short edge of a front surface (the bottom surface of another container) are adjacent to each other. In this state, the first power-receiving coil 3a and the first power-transmitting coil 3c of containers which are adjacent to each other are arranged facing each other, and the second power-receiving coil 3g and the second power-transmitting coil 3i of the containers are arranged facing each other. That is, the first power-receiving coil 3a and the first power-transmitting coil 3c of containers which are adjacent to each other can wirelessly transmit electric power therebetween though electromagnetic induction. In addition, the second power-receiving coil 3g and the second power-transmitting coil 3i of containers which are adjacent to each other can wirelessly transmit electric power therebetween though electromagnetic induction.

As shown in FIG. 3, the ground power-supplying unit s2 includes a rectifier circuit 4a, a power-supplying circuit 4b, and a power-transmitting coil 4c. The power-transmitting coil 4c is provided at the position facing the second power-receiving coil 3g of the container bn. That is, the ground power-supplying unit s2 is positioned under the container bn. The ground power-supplying unit s2 can wirelessly supply electric power to the second power-receiving coil 3g of the container bn using the power-transmitting coil 4c which is provided at the above-described position. The rectifier circuit 4a, the power-supplying circuit 4b and the power-transmitting coil 4c have functions similar to those of the rectifier circuit 2a, the power-supplying circuit 2b and the power-transmitting coil 2c of the ground power-supplying unit s1 of the first embodiment, and thus descriptions thereof are omitted here.

Next, the operations of the power supply system B having the above-described configuration are described in detail.

First, in the power supply system B, the containers b1 to bn are arranged in an arrangement state as shown in FIG. 3 (an arrangement step). Subsequently, the ground power-supplying unit s2 starts supplying electric power to the container bn (a first power-receiving unit) which is adjacent to the ground power-supplying unit s2. That is, in the ground power-supplying unit s2, the rectifier circuit 4a converts AC power obtained from the external power source, into DC power, and outputs the DC power to the power-supplying circuit 4b, and the power-supplying circuit 4b converts the DC power into AC power and outputs the AC power to the power-transmitting coil 4c. As a result, the power-transmitting coil 4c of the ground power-supplying unit s2 and the second power-receiving coil 3g of the container bn are electromagnetically coupled together, and the wireless power transmission is performed (a first power-supplying step).

Subsequently, in the container bn, the second power-receiving coil 3g outputs AC power received from the ground power-supplying unit s2, to the second power-receiving circuit 3h, and the second power-receiving circuit 3h converts the AC power into DC power and outputs the DC power through the second DC bus 3k to the second power-supplying circuit 3j and to the switching device 3n. In addition, the second power-supplying circuit 3j converts DC power input through the second DC bus 3k, into AC power, and outputs the AC power to the second power-transmitting coil 3i. As a result, the second power-transmitting coil 3i of the container bn is electromagnetically coupled with the second power-receiving coil 3g of the container bn-1 (a second power-receiving unit), and wirelessly supplies AC power to the second power-receiving coil 3g of the container bn-1 (a second power-supplying step).

Subsequently, containers b2 to bn-1 operate in a similar way to the container bn, and wirelessly supply AC power to containers b1 to bn-2 which are positioned above the containers b2 to bn-1, respectively. That is, as shown in FIG. 3, electric power is sequentially supplied from the ground power-supplying unit s2 to the containers b1 to bn in one direction (from lower to upper).

Furthermore, in the container b1 which is arranged at the highest position among the containers b1 to bn, the solar battery panel 3e provided in the top surface of the container b1 generates electric power using energy from sunlight, and outputs the generated DC power through the first DC bus 3f to the first power-supplying circuit 3d and to the switching device 3n. In addition, the first power-supplying circuit 3d converts DC power input through the first DC bus 3f, into AC power, and supplies the AC power to the first power-transmitting coil 3c. As a result, the first power-transmitting coil 3c of the container b1 is electromagnetically coupled with the first power-receiving coil 3a of the container b2, and wirelessly supplies AC power to the first power-receiving coil 3a of the container b2.

Subsequently, in the container b2, the first power-receiving coil 3a outputs AC power received from the container b1, to the first power-receiving circuit 3b, and the first power-receiving circuit 3b converts the AC power into DC power and outputs the DC power through the first DC bus 3f to the first power-supplying circuit 3d and to the switching device 3n. In addition, the first power-supplying circuit 3d converts DC power input through the first DC bus 3f, into AC power, and supplies the AC power to the first power-transmitting coil 3c. As a result, the first power-transmitting coil 3c of the container b2 is electromagnetically coupled with the first power-receiving coil 3a of the container b3, and wirelessly supplies AC power to the first power-receiving coil 3a of the container b3.

Subsequently, containers b3 to bn-1 operate in a similar way to the container b2, and wirelessly supply AC power to containers b4 to bn which are positioned under the containers b3 to bn-1, respectively. That is, as shown in FIG. 3, electric power is sequentially supplied from the solar battery panel 3e of the container b1 to the containers b2 to bn in one direction (from upper to lower).

The switching device 3n of each of the containers b1 to bn switches between supply routes of AC power to the load 3o based on voltage signals input from the first voltage sensor 3l and from the second voltage sensor 3m.

For example, when the voltage of DC power supplied through the first DC bus 3f from the first power-receiving coil 3a or from the solar battery panel 3e is greater than the voltage required to drive (or to charge) the load 3o, the switching device 3n sets DC power flowing from the first DC bus 3f to the load 3o.

In contrast, when the voltage of DC power supplied through the second DC bus 3k from the second power-receiving coil 3g is greater than the voltage required to drive (or to charge) the load 3o, the switching device 3n sets DC power flowing from the second DC bus 3k to the load 3o. When both of the voltage of DC power of the first DC bus 3f and the voltage of DC power of the second DC bus 3k are greater than the voltage required to drive (or to charge) the load 3o, it is preferable that the switching device 3n select the first DC bus 3f and set the first DC bus 3f to supply electric power to the load 3o (internal consumption). Since the electric power from the solar battery panel 3e is supplied to the first DC bus 3f, by selecting the first DC bus 3f, the amount of electric power supplied from the ground power-supplying unit s2 can be reduced. In addition, when both of the voltage of DC power of the first DC bus 3f and the voltage of DC power of the second DC bus 3k are less than the voltage required to drive (or to charge) the load 3o, the switching device 3n sets each of the first DC bus 3f and the second DC bus 3k not to supply DC power to the load 3o.

According to the above-described second embodiment, the containers b1 to bn are electromagnetically coupled with each other through the second power-receiving coils 3g and the second power-transmitting coils 3i. The ground power-supplying unit s2 supplies AC power to the second power-receiving coil 3g of the container bn positioned at the end, whereby it is possible to supply AC power to all the containers b1 to bn. Consequently, according to the second embodiment, it is not necessary to provide a power-supplying unit at each of the containers b1 to bn, the number of power-supplying units can be reduced, and it is possible to supply electric power to each of the containers b1 to bn while the installation space of the power-supplying units is further decreased than in the related art.

Furthermore, according to the second embodiment, the containers b1 to bn are electromagnetically coupled with each other through the first power-receiving coils 3a and the first power-transmitting coils 3c, and thus it is possible to supply electric power generated by the solar battery panel 3e of the container b1, to all the containers b1 to bn.

Third Embodiment

Figure 6A:
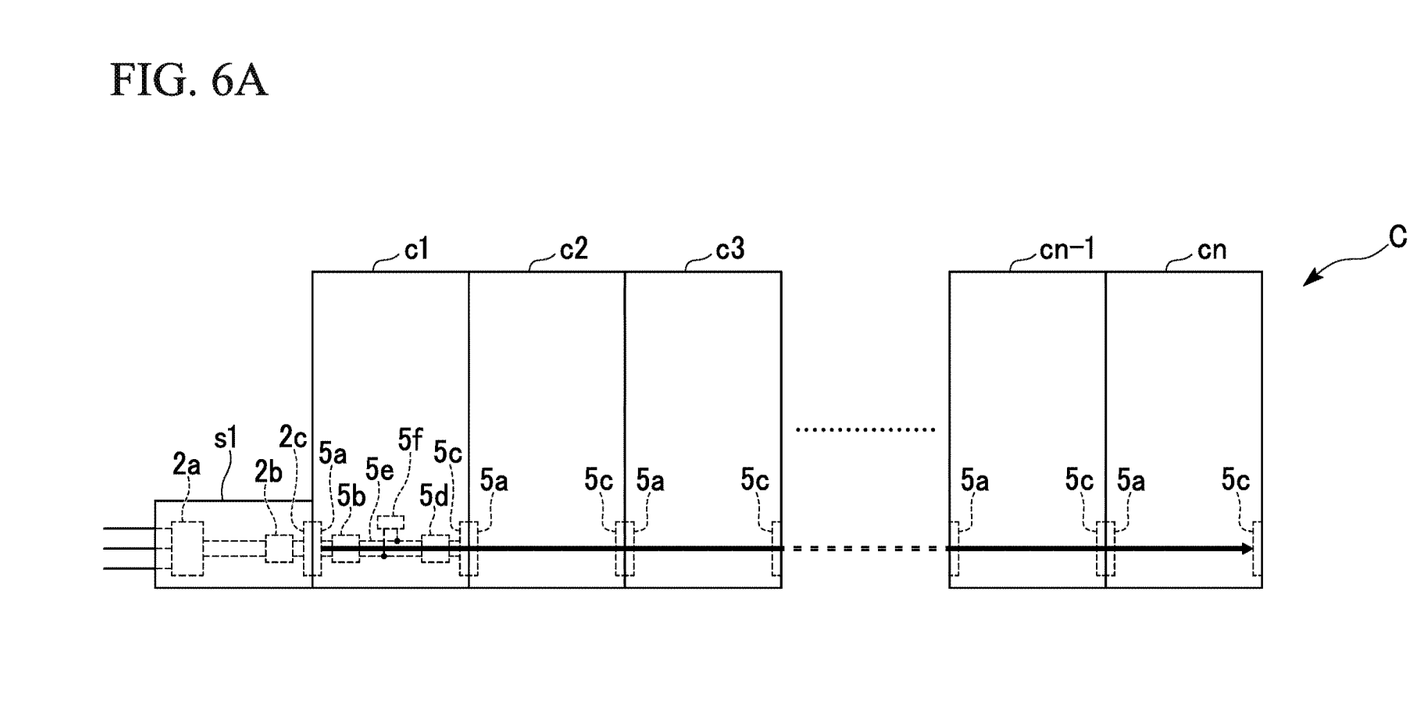
FIG. 6A is a top view showing a first arrangement state of a power supply system according to a third embodiment of the present invention.
Figure 6B:
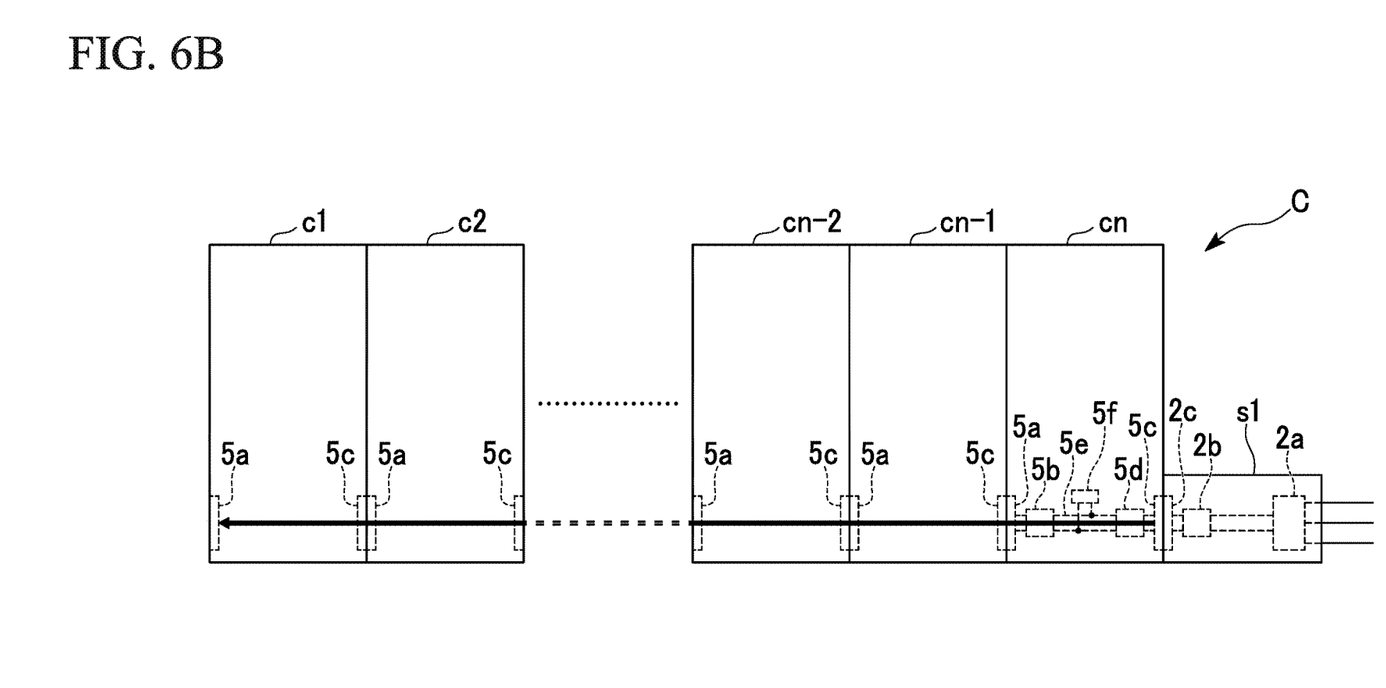
FIG. 6B is a top view showing a second arrangement state of the power supply system according to the third embodiment of the present invention.

Next, a third embodiment is described with reference to FIGS. 6A and 6B. FIG. 6A is a top view showing a first arrangement state of a power supply system C according to the third embodiment. FIG. 6B is a top view showing a second arrangement state of the power supply system C according to the third embodiment.

In the power supply system C of the third embodiment, the configurations of containers c1 to cn are different from those of the above-described first embodiment. Accordingly, in the third embodiment, the components of a ground power-supplying unit s1 which have the same configurations as those of the first embodiment are represented by the same reference signs, and descriptions thereof are omitted here.

As shown in FIGS. 6A and 6B, the power supply system C includes the containers c1 to cn (power-receiving units) and the ground power-supplying unit s1.

Similar to the above-described first embodiment, the containers c1 to cn are movable box-shaped metal storage containers and store various cargos in an internal space (a storage space). As shown in FIGS. 6A and 6B, the shape of each of the containers c1 to cn when viewed from above is rectangle. That is, each of the containers c1 to cn includes a left lateral surface and a right lateral surface (a pair of outer surfaces) which are disposed to be parallel to each other. The containers c1 to cn are placed on a container yard or on a container ship so that a left lateral surface including a long edge of the container (the left lateral surface of one container) and a right lateral surface including a long edge of the container (the right lateral surface of another container) are adjacent to each other. The containers c1 to cn have the same configuration, and accordingly, hereinafter the configuration of the container c1 is described as a typical example.

The container c1 includes a first power-receiving/transmitting coil 5a (a power-receiving/supplying device), a first power-receiving/supplying circuit 5b (a power-receiving/supplying device), a second power-receiving/transmitting coil 5c (a power-receiving/supplying device), a second power-receiving/supplying circuit 5d (a power-receiving/supplying device), a DC bus 5e, and a load 5f (a load device) in addition to the above-described storage space. The first power-receiving/transmitting coil 5a and the first power-receiving/supplying circuit 5b among the above components compose a power-receiving/supplying device of this embodiment, have functions of a power-receiving device and a power-supplying device, and can switch between the functions of the power-receiving device and the power-supplying device. In addition, the second power-receiving/transmitting coil 5c and the second power-receiving/supplying circuit 5d also compose a power-receiving/supplying device of this embodiment, have functions of a power-receiving device and a power-supplying device, and can switch between the functions of the power-receiving device and the power-supplying device.

The first power-receiving/transmitting coil 5a is a helical coil which is provided in the left lateral surface of the container c1, and both ends of the coil are connected to the input/output terminals of the first power-receiving/supplying circuit 5b. The portion of the left lateral surface of the container c1 in which the first power-receiving/transmitting coil 5a is provided is formed not of metal but of a magnetic field transmissible material through which an external magnetic field can generate electromagnetic induction on the first power-receiving/transmitting coil 5a and through which a magnetic field generated by the first power-receiving/transmitting coil 5a can be transmitted to outside of the container c1. The first power-receiving/transmitting coil 5a generates electromotive force through electromagnetic induction when the external magnetic field acts on the container c1 and outputs electric power generated through electromagnetic induction, to the first power-receiving/supplying circuit 5b. In addition, the first power-receiving/transmitting coil 5a performs the wireless power supplying to the second power-receiving/transmitting coil 5c of a container which is adjacent to the left side thereof in FIG. 6B using AC power supplied from the first power-receiving/supplying circuit 5b.

The first power-receiving/supplying circuit 5b includes a resonance capacitor, wherein the resonance capacitor and the first power-receiving/transmitting coil 5a compose a power-receiving/supplying resonance circuit. In addition, the first power-receiving/supplying circuit 5b is a rectifier circuit which converts AC power supplied from the first power-receiving/transmitting coil 5a, into DC power, and is an inverter which converts DC power supplied through the DC bus 5e from the second power-receiving/supplying circuit 5d (described below), into AC power, and supplies the AC power to the first power-receiving/transmitting coil 5a. That is, the first power-receiving/transmitting coil 5a and the first power-receiving/supplying circuit 5b can switch between power receiving and power supplying and can perform one thereof. When operating as a power-receiving circuit, the first power-receiving/supplying circuit 5b supplies the DC power through the DC bus 5e to the second power-receiving/supplying circuit 5d and to the load 5f. In addition, when operating as a power-supplying circuit, the first power-receiving/supplying circuit 5b converts DC power supplied through the DC bus 5e from the second power-receiving/supplying circuit 5d (described below), into AC power, and supplies the AC power to the first power-receiving/transmitting coil 5a.

A power-receiving/supplying circuit in the wireless power transmission which can switch between receiving power and supplying power and can perform one thereof is disclosed in, for example, FIG. 4 of Japanese Patent Application, First Publication No. H8-19985.

The second power-receiving/transmitting coil 5c is a helical coil which is provided in the right lateral surface of the container c1, and both ends of the coil are connected to the input/output terminals of the second power-receiving/supplying circuit 5d. The portion of the right lateral surface of the container c1 in which the second power-receiving/transmitting coil 5c is provided is formed not of metal but of a magnetic field transmissible material through which an external magnetic field can generate electromagnetic induction on the second power-receiving/transmitting coil 5c and through which a magnetic field generated by the second power-receiving/transmitting coil 5c can be transmitted to outside of the container c1. The second power-receiving/transmitting coil 5c generates electromotive force through electromagnetic induction when the external magnetic field acts on the container c1 and outputs electric power generated through electromagnetic induction, to the second power-receiving/supplying circuit 5d. In addition, the second power-receiving/transmitting coil 5c performs the wireless power supplying to the first power-receiving/transmitting coil 5a of a container which is adjacent to the right side thereof in FIG. 6A using AC power supplied from the second power-receiving/supplying circuit 5d.

The second power-receiving/supplying circuit 5d includes a resonance capacitor, wherein the resonance capacitor and the second power-receiving/transmitting coil 5c compose a power-receiving/supplying resonance circuit. In addition, the second power-receiving/supplying circuit 5d is a rectifier circuit which converts AC power supplied from the second power-receiving/transmitting coil 5c, into DC power, and is an inverter which converts DC power supplied through the DC bus 5e from the first power-receiving/supplying circuit 5b, into AC power, and supplies the AC power to the second power-receiving/transmitting coil 5c. That is, the second power-receiving/transmitting coil 5c and the second power-receiving/supplying circuit 5d can switch between power receiving and power supplying and can perform one thereof. When operating as a power-receiving circuit, the second power-receiving/supplying circuit 5d supplies the DC power through the DC bus 5e to the first power-receiving/supplying circuit 5b and to the load 5f. In addition, when operating as a power-supplying circuit, the second power-receiving/supplying circuit 5d converts DC power supplied through the DC bus 5e from the first power-receiving/supplying circuit 5b, into AC power, and supplies the AC power to the second power-receiving/transmitting coil 5c.

The resonance circuit composed of the second power-receiving/transmitting coil 5c and the second power-receiving/supplying circuit 5d is set to have the same resonance frequency as that of the resonance circuit composed of the first power-receiving/transmitting coil 5a and the first power-receiving/supplying circuit 5b.

Similar to the power-receiving coil 1a and the power-transmitting coil 1c of the first embodiment, the first power-receiving/transmitting coil 5a and the second power-receiving/transmitting coil 5c are provided at positions which are line-symmetrical when viewed from above (left-right symmetry in FIGS. 6A and 6B). In addition, the distance in the vertical direction from the bottom surface (or from the top surface) of the container c1 to the first power-receiving/transmitting coil 5a is the same as the distance in the vertical direction from the bottom surface (or from the top surface) of the container c1 to the second power-receiving/transmitting coil 5c. In other words, the first power-receiving/transmitting coil 5a and the second power-receiving/transmitting coil 5c are provided in the left lateral surface and in the right lateral surface of the container c1, respectively, at positions which are opposite to each other both in the top view and in the front view (not shown).

The DC bus 5e is composed of a pair of power lines used to transmit DC power output from the first power-receiving/supplying circuit 5b, to the second power-receiving/supplying circuit 5d and to the load 5f, and used to transmit DC power output from the second power-receiving/supplying circuit 5d, to the first power-receiving/supplying circuit 5b and to the load 5f.

The load 5f is one of various kinds units which is selected based on the kind of the container c1 (an auxiliary function), and those units include, for example, a refrigeration unit, a ventilation unit, a heat-retention unit, and a cooling unit. The load 5f is driven by DC power supplied from the first power-receiving/supplying circuit 5b or from the second power-receiving/supplying circuit 5d. That is, the container c1 is a reefer container (a refrigeration container) used to store fresh food, frozen food and the like in a state where they are frozen by a refrigeration unit, a ventilator container (a ventilation container) in which internal air is always ventilated by a ventilation unit (a ventilator), or the like. The load $5f$ may be a storage battery to store surplus power.

In the container c1, within the DC power output from one of the first power-receiving/supplying circuit $5b$ and the second power-receiving/supplying circuit $5d$, the electric power remaining after removing electric power to be consumed by the load $5f$ is supplied to the other of the first power-receiving/supplying circuit $5b$ and the second power-receiving/supplying circuit $5d$. In a state where the load $5f$ stops working, since the load $5f$ does not consume electric power, all the DC power output from one of the first power-receiving/supplying circuit $5b$ and the second power-receiving/supplying circuit $5d$ is supplied to the other of the first power-receiving/supplying circuit $5b$ and the second power-receiving/supplying circuit $5d$. That is, in the container c1, part of or all of the DC power output from the first power-receiving/supplying circuit $5b$ or from the second power-receiving/supplying circuit $5d$ (at least part of the DC power) is supplied to the first power-receiving/supplying circuit $5b$ or to the second power-receiving/supplying circuit $5d$ in accordance with the state of the load $5f$.

As shown in FIGS. 6A and 6B, the containers c1 to cn are placed so that a left lateral surface including a long edge of the container (the left lateral surface of one container) and a right lateral surface including a long edge of the container (the right lateral surface of another container) are adjacent to each other. In this state, the first power-receiving/transmitting coil $5a$ and the second power-receiving/transmitting coil $5c$ of containers which are adjacent to each other are arranged facing each other. That is, the first power-receiving/transmitting coil $5a$ and the second power-receiving/transmitting coil $5c$ of containers which are adjacent to each other can wirelessly transmit electric power to each other through electromagnetic induction.

Next, the operations of the power supply system C having the above-described configurations are described in detail.

First, in the power supply system C, the containers c1 to cn are arranged in an arrangement state as shown in FIG. 6A (an arrangement step). Subsequently, the ground power-supplying unit s1 starts supplying electric power to the container c1 (a first power-receiving unit) which is adjacent to the ground power-supplying unit s1. That is, in the ground power-supplying unit s1, the rectifier circuit $2a$ converts AC power obtained from the external power source, into DC power, and outputs the DC power to the power-supplying circuit $2b$. In addition, the power-supplying circuit $2b$ converts the DC power into AC power and supplies the AC power to the power-transmitting coil $2c$. As a result, the power-transmitting coil $2c$ of the ground power-supplying unit s1 and the first power-receiving/transmitting coil $5a$ of the container c1 are electromagnetically coupled together, and wireless power transmission is performed (a first power-supplying step).

Subsequently, in the container c1, the first power-receiving/transmitting coil $5a$ outputs AC power received from the ground power-supplying unit s1, to the first power-receiving/supplying circuit $5b$, and the first power-receiving/supplying circuit $5b$ converts the AC power into DC power and outputs the DC power through the DC bus $5e$ to the second power-receiving/supplying circuit $5d$ and to the load $5f$. In addition, the second power-receiving/supplying circuit $5d$ converts DC power supplied through the DC bus $5e$, into AC power, and supplies the AC power to the second power-receiving/transmitting coil $5c$. As a result, the second power-receiving/transmitting coil $5c$ of the container c1 is electromagnetically coupled with the first power-receiving/transmitting coil $5a$ of the container c2 (a second power-receiving unit), and wirelessly supplies AC power to the first power-receiving/transmitting coil $5a$ of the container c2 (a second power-supplying step).

Subsequently, containers c2 to cn-1 operate similar to the container c1 and wirelessly supply AC power to the containers c3 to cn which are positioned on the right side of the containers c2 to cn-1, respectively. That is, as shown in FIG. 6A, electric power is sequentially supplied from the ground power-supplying unit s1 to the containers c1 to cn in one direction (from left to right).

In addition, in the power supply system C, the containers c1 to cn are also arranged in an arrangement state as shown in FIG. 6B (an arrangement step). Subsequently, the ground power-supplying unit s1 starts supplying electric power to the container cn (a first power-receiving unit) which is adjacent to the ground power-supplying unit s1. That is, in the ground power-supplying unit s1, the power-transmitting coil $2c$ is electromagnetically coupled with the second power-receiving/transmitting coil $5c$ of the container cn, and the wireless power transmission is performed (a first power-supplying step).

Subsequently, in the container cn, the second power-receiving/transmitting coil $5c$ outputs AC power received from the ground power-supplying unit s1, to the second power-receiving/supplying circuit $5d$, and the second power-receiving/supplying circuit $5d$ converts the AC power into DC power and outputs the DC power through the DC bus $5e$ to the first power-receiving/supplying circuit $5b$ and to the load $5f$. In addition, the first power-receiving/supplying circuit $5b$ converts DC power input through the DC bus $5e$, into AC power, and supplies the AC power to the first power-receiving/transmitting coil $5a$. As a result, the first power-receiving/transmitting coil $5a$ of the container cn is electromagnetically coupled with the second power-receiving/transmitting coil $5c$ of the container cn-1 (a second power-receiving unit), and wirelessly supplies AC power to the second power-receiving/transmitting coil $5c$ of the container cn-1 (a second power-supplying step).

Subsequently, containers c2 to cn-1 operate in a similar way to the container cn and wirelessly supply AC power to the containers c1 to cn-2 which are positioned on the left side of the containers c2 to cn-1, respectively. That is, as shown in FIG. 6B, electric power is sequentially supplied from the ground power-supplying unit s1 to the containers c1 to cn in one direction (from right to left).

According to the above-described third embodiment, the containers c1 to cn are electromagnetically coupled with each other in both directions using the first power-receiving/transmitting coils $5a$ and the second power-receiving/transmitting coils $5c$. The ground power-supplying unit s1 supplies AC power to the first power-receiving/transmitting coil $5a$ of the container c1 positioned at the end or to the second power-receiving/transmitting coil $5c$ of the container cn, whereby it is possible to supply AC power to all the containers c1 to cn. Consequently, according to the third embodiment, it is not necessary to provide a power-supplying unit at each of the containers c1 to cn, the number of power-supplying units can be reduced, and it is possible to supply electric power to each of the containers c1 to cn while the installation space of the power-supplying units is further decreased than in the related art.

Hereinbefore, the embodiments of the present invention were described, but the present invention is not limited to the above embodiments and is limited only by the scopes of attached claims. The shape, the combination or the like of each component shown in the above embodiments is an example, and addition, omission, replacement, and other modifications of configurations can be performed within the scope of and not departing from the gist of the present invention. For example, the following modifications can be considered.

(1) In the above embodiments, the wireless power supplying is performed from a ground power-supplying unit to a container or is performed between containers, but the present invention is not limited thereto. For example, not using the wireless power supplying, in a state where they physically directly contact each other, electric power may be supplied from a ground power-supplying unit to a container or may be supplied between containers. In addition, in the above embodiments, the magnetic field resonance is adopted as the type of wireless power supply, but the electromagnetic induction may be adopted.

(2) In the above embodiments, a power-receiving coil, a power-transmitting coil, and a power-receiving/transmitting coil are helical coils. However, if possible to perform the wireless power supplying, the type of a coil is not limited. In addition, if possible to perform the wireless power supplying, the shape of a coil is not limited to a circle.

(3) In the second embodiment, the solar battery panel $3e$ is provided on each top surface of the containers b1 to bn, but the present invention is not limited thereto. For example, a solar battery panel may be provided on the front surface, both lateral surfaces, or the back surface other than the top surface. Therefore, not only the container b1 which is disposed at the highest position but also the other containers b2 to bn can generate electric power.

(4) In the first and third embodiments, electric power is supplied to the containers a1 to an (or c1 to cn) which are arranged in the horizontal direction (the left-and-right horizontal direction), and in the second embodiment, electric power is supplied to the containers b1 to bn which are stacked in the vertical direction, but the present invention is not limited thereto. For example, in a state where the arrangement of or the number of power-receiving coils and power-transmitting coils of a container is appropriately changed and containers are arranged in one direction of the horizontal direction and the vertical direction, electric power is supplied to the container positioned at the end, and thereby all the containers may be supplied with electric power. In addition, in order to supply electric power to containers which are arranged not only in the left-and-right direction and the up-and-down direction but also in the back-and-forth horizontal direction, the arrangement of or the number of power-receiving coils and power-transmitting coils may be appropriately changed.

(5) In the above embodiments, electric power is supplied to all the containers as power-receiving units, but the present invention is not limited thereto. For example, batteries including power-receiving devices and power-supplying devices are electromagnetically coupled together, and electric power is supplied to the battery positioned at the end, whereby electric power may be supplied to all the batteries. That is, the power-receiving unit of the present invention is not limited to a container. In addition, the shape of a power-receiving unit is not limited to a box shape as the container, and the power-receiving unit may have, for example, a cylindrical shape. That is, it is sufficient if a power-receiving unit of the present invention includes a pair of outer surfaces which are disposed to be parallel to each other.

(6) The first power-receiving/transmitting coil $5a$ and the second power-receiving/transmitting coil $5c$ are provided in the left lateral surface and in the right lateral surface of a container in the third embodiment, and a power-receiving/transmitting coil may be provided in the containers b1 to bn of the second embodiment instead of the first power-receiving coil $3a$, the first power-transmitting coil $3c$, the second power-receiving coil $3g$, or the second power-transmitting coil $3i$. That is, in the present invention, the installation position of a power-receiving/transmitting coil is not limited to the left lateral surface or to the right lateral surface.

(7) In the above embodiments, the containers a1 to an, the containers b1 to bn, and the containers c1 to cn are formed of metal, and only the portion in which a power-receiving coil, a power-transmitting coil, or a power-receiving/transmitting coil is provided is formed of a magnetic field transmissible material. However, the entire container (the entire outer shell of a container) may be formed of a magnetic field transmissible material having the strength and rigidity suitable for the use of the container. In addition, a larger portion including the portion in which a power-receiving coil, a power-transmitting coil, or a power-receiving/transmitting coil is provided may be formed of a magnetic field transmissible material.

(8) In the above embodiments, in either the containers a1 to an, the containers b1 to bn, or the containers c1 to cn, containers are adjacent to each other, but if the wireless power supplying is used, it is not necessary to make the containers contact each other with no gap. It is only necessary to arrange containers so that the distance between a power-receiving coil and a power-transmitting coil used to perform the wireless power supplying (in the third embodiment, between a pair of power-receiving/transmitting coils which face each other) is within the distance in which the wireless power supplying can be performed (e.g., several centimeters to several tens centimeters, the distance depending on the type of wireless power supply).

INDUSTRIAL APPLICABILITY

The present invention can be applied to a power supply system or to a wireless power supply method.

The invention claimed is:

1. A power supply system comprising:
movable power-receiving units, each power-receiving unit including at least one power-receiving device receiving electric power from outside of the power-receiving unit and at least one power-supplying device supplying, to outside of the power-receiving unit, at least part of electric power received by the power-receiving device; and
a power-supplying unit supplying electric power to the power-receiving device of one of the power-receiving units;
wherein each power-receiving unit is configured to supply electric power from the power-receiving device to the power-supplying device without supplying electric power from the power-receiving device to an internal consumption when a voltage of electric power to be supplied from the power-receiving device is less than the voltage required to drive or charge the internal consumption.

2. The power supply system according to claim 1, wherein the power-receiving unit includes a power-generating device and is configured to supply electric power generated by the power-generating device, to outside of the power-receiving unit, through the power-supplying device.

3. The power supply system according to claim 1, wherein the power-receiving unit includes:

a load device consuming electric power; and a switching device supplying electric power from the power-receiving device to the load device when a voltage of electric power from the power-receiving device is greater than a voltage required to run the load device.

4. The power supply system according to claim 2, wherein the power-receiving unit includes:

a load device consuming electric power; and a switching device supplying electric power from the power-receiving device or from the power-generating device to the load device when a voltage of electric power from the power-receiving device or from the power-generating device is greater than a voltage required to run the load device.

5. The power supply system according to claim 1, wherein the power-receiving device, the power-supplying device and the power-supplying unit are configured to wirelessly receive or supply electric power.

6. The power supply system according to claim 5, wherein the power-receiving device includes a power-receiving coil, each of the power-supplying device and the power-supplying unit includes a power-transmitting coil, and the power-receiving device, the power-supplying device and the power-supplying unit are configured to wirelessly receive or supply electric power through an electromagnetic coupling between the power-receiving coil and the power-transmitting coil.

7. The power supply system according to claim 1, wherein the power-receiving unit includes a pair of outer surfaces parallel to each other, the power-receiving device is provided in a first outer surface of the pair of outer surfaces, and the power-supplying device is provided in a second outer surface of the pair of outer surfaces.

8. The power supply system according to claim 1, wherein the power-receiving unit includes a pair of outer surfaces parallel to each other, and the power-receiving device and the power-supplying device are provided in each of the pair of outer surfaces.

9. The power supply system according to claim 1, wherein the power-receiving unit includes at least two power-receiving/supplying devices, and each power-receiving/supplying device has a function of the power-receiving device and a function of the power-supplying device, and each power-receiving/supplying device is configured to switch between the function of the power-receiving device and the function of the power-supplying device.

10. A wireless power supply method comprising:

an arrangement step of arranging a power-supplying device of a movable first power-receiving unit and a power-receiving device of a movable second power-receiving unit facing each other;

a first power-supplying step of wirelessly supplying electric power to a power-receiving device of the first power-receiving unit from outside of the first power-receiving unit; and a second power-supplying step of wirelessly supplying, to the power-receiving device of the second power-receiving unit from the power-supplying device of the first power-receiving unit, electric power obtained by the power-supplying device of the first power-receiving unit from the power-receiving device of the first power-receiving unit without supplying electric power from the power-receiving device of the first power-receiving unit to an internal consumption when a voltage of electric power to be supplied from the power-receiving device of the first power-receiving unit is less than the voltage required to drive or charge the internal consumption.

\* \* \* \* \*